Jan. 27, 1970  L. WIESNER  3,491,531
IMPULSE MEANS FOR A HOROLOGICAL OSCILLATOR
Filed May 3, 1968  3 Sheets-Sheet 1

INVENTOR.
LEO WIESNER
BY
Davis, Hoxie, Faithfull & Hapgood
ATTORNEYS

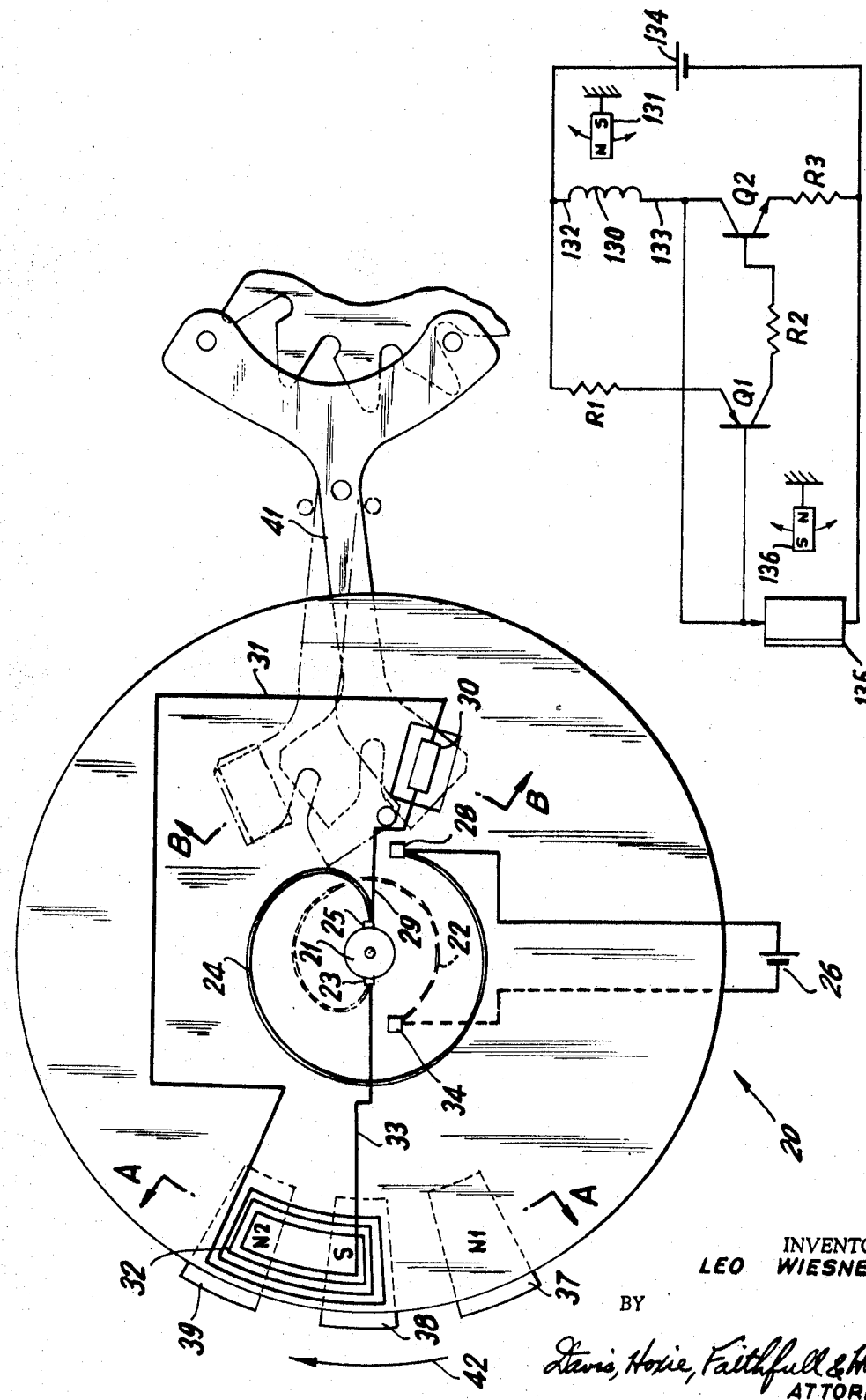

Jan. 27, 1970   L. WIESNER   3,491,531
IMPULSE MEANS FOR A HOROLOGICAL OSCILLATOR
Filed May 3, 1968   3 Sheets-Sheet 3

INVENTOR.
LEO WIESNER
BY
Davis, Hoxie, Faithfull & Hapgood
ATTORNEYS

United States Patent Office 3,491,531
Patented Jan. 27, 1970

---

3,491,531
IMPULSE MEANS FOR A HOROLOGICAL OSCILLATOR
Leo Wiesner, Kew Gardens, N.Y., assignor to The United States Time Corporation, Waterbury, Conn., a corporation of Connecticut
Filed May 3, 1968, Ser. No. 726,319
Int. Cl. G04c 3/04
U.S. Cl. 58—28                                  8 Claims

ABSTRACT OF THE DISCLOSURE

A horological instrument, which includes an oscillating time base, is powered by a battery which supplies current to one or more coils. The coil may move relative to one or more magnetic fields. The current is controlled, directly or indirectly, by a magneto-diode which is positioned so that it moves relative to a magnetic field.

---

The present invention relates to horology and more particularly to a battery powered watch including an electronic circuit.

There have been many proposals for the construction of battery powered horological instruments. It is more difficult to produce a commercially acceptable battery powered watch than it is to produce a battery powered clock. A watch, and particularly a wrist watch, should be relatively small, light-weight, accurate, and the battery should last at least one year. As the battery and other parts of the movement take up a certain amount of space, it is desirable that electronic circuit should be as small as possible. The size of the battery, and therefore its power, is very limited, so that the electronic circuit and the driving motor should consume as little power as possible. It has been proposed that the battery may be replaced by, or ancillary to, a solar cell, but such an arrangement still places limits as to power consumption. In addition, it is desirable that the electronic circuit be simple and low in cost.

In one type of electronic circuit proposed for use in a horological instrument, one or more transistors are connected to two coils, one coil acting as the drive coil and the other coil acting as the pick-up coil. However, it is relatively expensive to wind two coils and to make the necessary connections to them. It has also been proposed that a single coil be used; however, the suggested electronic circuitry consists of a number of transistors, resistors and capacitors resulting in a relatively large and expensive circuit. A simple circuit using a tunnel diode as a negative resistance device has also been suggested; however, the cost, current leakage, instability and temperature sensitivity of tunnel diodes has not made such circuits commercially feasible.

It is the objective of the present invention to provide a battery powered horological instrument whose electronic circuit is relatively simple, low in cost, low in power consumption, and small in size.

In accordance with the present invention, a magneto-diode is utilized in the electronic circuit of a horological instrument to control, directly or indirectly, the current flow from the battery. The magneto-diode is a semi-conductive solid-state device in which current flow is a function of the proximity to the device of a magnetic field. In effect, the magneto-diode replaces the pick-up coil in a two-coil system. In one embodiment, the magneto-diode is carried on the balance wheel oscillator of a watch and it passes through the flux field of a permanent magnet carried on an oscillating lever. The magneto-diode controls the current flow from a battery to a coil carried by the balance wheel, the coil interacting with the flux fields of one or more fixed permanent magnets. Other embodiments, within the present invention, utilize the magnet being carried by the balance wheel and the magneto-diode being fixed to the oscillatory lever; the drive magnet being carried by the balance wheel and the drive coil being fixed; and a controlled electromagnet acting on a fork lever in which the oscillator performs only a timing function.

Other objectives will be apparent from the following written detailed description of the invention, which, taken together with the attached drawings forming a part of the said description, sets forth the best mode contemplated by the inventor of carrying out his invention.

In the drawings:

FIG. 3 is a top plan view of the balance wheel assembly of the first embodiment of the present invention;

FIG. 8 is a schematic diagram of an electronic circuit constituting a fourth embodiment of the present invention.

Figure 1:
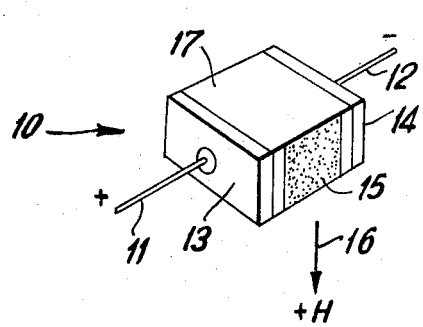
FIG. 1 is a perspective view showing the principle of operation of a magneto-diode.

The principle of operation of a magneto-diode is shown in FIG. 1. A "magneto-diode," as the term is used herein, is a solid-state magnetosensitive semi-conductive element having at least two electrical leads. The positive lead 11 of magneto-diode 10 is connected to a source of current, such as a battery or a solar cell. The layer 13, to which positive lead 11 is connected, is of a positive P acceptor material. Lead 12 is connected to negative N layer 14 of donor material. A body 17 of intrinsic semi-conductor material having a low carrier density separates layers 13 and 14. A zone 15 on the body 17 is formed, for example, by diffusion of impurities, so that the re-combination of holes and electrons in intrinsic body 17 takes place mainly at the zone 15.

The direction of magnetic flux H applied proximate to the magneto-diode 10 is shown by arrow 16, which indicates the direction of flux. The absence of such flux causes less conduction in the forward direction. The presence of flux in direction 16 causes the diode 10 to conduct more in the forward direction, and the flux in the opposite direction causes the diode to conduct even less in the forward direction.

Figure 2:
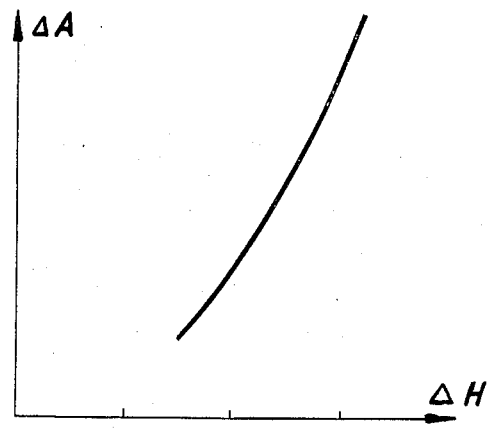
FIG. 2 is a graph indicating the relationship between current and magnetic flux in a magneto-diode.

As shown in FIG. 2, an increase in flux, i.e., ΔH north to south direction, causes more current flow, i.e., ΔA through the diode.

A theory of the operation of the magneto-diode is that the rate of re-combination of the holes and electrons, i.e., their mean effective lives, is determined primarily by their deflection towards or away from the zone 15. When they are deflected from that zone, by an applied magnetic flux field +H, their life is increased, resulting in greater current. Conversely, an applied field —H defects them toward zone 15, resulting in their shorter lifetime and a reduced current.

In the wristwatch structure shown in FIG. 3 a balance wheel 20 is fixed to a balance wheel staff 21.

A first spiral hairspring 22 is connected, by a hub, to the balance wheel staff 21, see FIG. 3. The outer end of the hairspring 22 is connected to a contact 34 fixed in the frame plate of the watch. This contact 34 is connected to the first contact of a battery 26 or other source of direct current, such as a solar cell. The sairspring 22 terminates in contact 23 on the hub or on the balance wheel staff. A second similar hair spring 24 is connected to the balance wheel staff 21 by a hub and terminates in contact 25 on the staff or on the hub. The outer end of hairspring 24 is fixed to a contact post 28 supported by, and insulated from the frame member. This contact 28 is connected with the second terminal of the battery 26. A wire 29 is connected from terminal 25 to one end of the magneto-diode 30. The magneto-diode 30 is fixed within a hole of the balance wheel 20 or is fixed to the bottom of the balance wheel. A second lead 31 from magneto-diode 30 is connected to one end of an electrical coil 32. The coil may be of any shape and is preferably rectangular or round. Wire 33, which is the second lead of coil 32, is connected to terminal 23.

Figure 4:
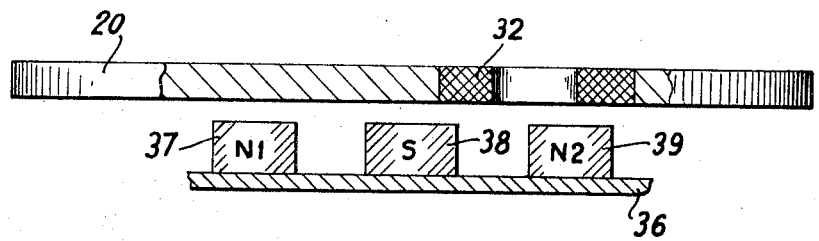
FIG. 4 is a cross-sectional view taken along section A—A of FIG. 3.

As shown in FIG. 4, three permanent magnets—a first north magnet 37, a south magnet 38, and a second north magnet 39—are fixed to the second frame plate 36 of the watch. These magnets are permanent magnets and, for example, may be ferrite magnets of a generally rectangular shape. These magnets are spaced apart so that the sides of the coil 32 are positioned only over two magnets simultaneously. The three magnets 37, 38 and 39 provide a driving torque to the balance wheel upon passage of the electrical current through the coil 32. The coil 32 is electrically connected in series with the magneto-diode 30, which is mounted on the balance wheel 20. The series combination of the coil 32 and the magneto-diode 30 is connected to a source of electrical power 26 by means of the hairsprings 22 and 24.

In the position shown in FIG. 3, the coil 32 is positioned over the magnets 39 and 38 and the torque generated by the current flow is in the clockwise direction, as shown by the arrow 42 of FIG. 3. When the same coil with the same direction of current is positioned over magnets 38 and 37, a counterclockwise torque is generated, that is, the generated torque is opposite in direction to arrow 42.

The magneto-diode 30 is mounted on the balance wheel so that it does not pass within the fields of the magnets 37, 38 and 39. For example, the magneto-diode is mounted on the balance wheel radially inward towards the balance wheel staff. The magnets 37, 38 and 39 terminate, in the inward radial direction, before the path of movement of the magneto-diode 30.

Figure 5:
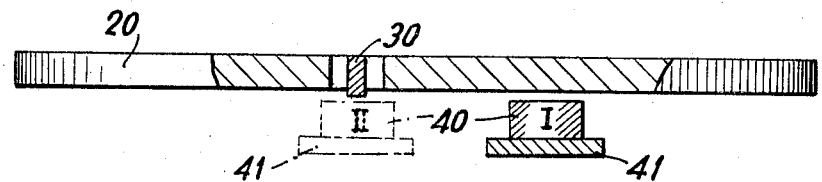
FIG. 5 is a cross-sectional view taken along section B—B of FIG. 3.

The magneto-diode 30 passes within the field of a small movable magnet 40. The magnet 40 is a small permanent magnet, for example, of a platinum-cobalt alloy, and is positioned to that its flux field is crossed by magneto-diode 30. The movable magnet 40 is first in the position I, as shown in FIG. 5, in the clockwise direction of the balance wheel. The small movable magnet 40 is in position II when the balance wheel is rotated in the counterclockwise direction. The small magnet 40 is preferably mounted on a fork lever 41. The fork lever serves the following functions: (1) it provides a mechanism whereby the magnet 40 may be shifted from its first position I to its second position II in a timed sequence with the movement of the balance wheel so that the current to the coil flows at predetermined times. In one direction the current flows before a center line through magnet 38, i.e., when the coil 32 shadows magnets N2–39 and S–38; and in the opposite direction the current flows after that center line, i.e., when the coil 32 shadows magnets N1–37 and S–38; (2) as in conventional watches, the lever provides a mechanism to prevent overbanking of the balance wheel; (3) as in some other electrical or electronic watches, the lever provides a mechanism to transmit power from the driven balance wheel to the index wheel.

In operation, in the position shown in FIG. 3, the magneto-diode 30 is in the field of the magnet 40, which is in its position I. The magneto-diode, due to the direction of flux H, as shown in FIG. 1, is heavily conducting. A large current from battery 26 is permitted by the magneto-diode 30 to flow through the coil 32, which imparts a torque to the balance wheel in the clockwise direction, shown by arrow 42. As soon as the magneto-diode 30 has left the field of its control magnet 40, the conductance of the diode drops, as shown by the graph of FIG. 2. The current is reduced to a low value so that only a small leakage current flows through the coil 32. When the balance wheel has reached the end of its clockwise oscillation, it starts back in a counterclockwise direction. The counterclockwise rotation of the balance wheel causes the index lever 41 to shift its position, as shown by the dotted lines. The index lever 41 carries its control magnet 40 to the position II, shown in FIG. 5. The arrangement of the various components is such that the magneto-diode 30 is not within the field of its control magnet 40 when the coil 32 is within the flux fields of the magnets 39 and 38 during its counterclockwise rotation. The magneto-diode is within the flux field of the magnet 40, in its position II, when the coil 32 is positioned within the flux field of the magnets 38 and 37 during its counterclockwise rotation. Consequently, a counterclockwise torque is imparted to the balance wheel, as current flows through coil 32 at that instant. After the coil 32 has left magnets 38 and 39, the current drops again to the leakage current of the magneto-diode.

Figure 6:
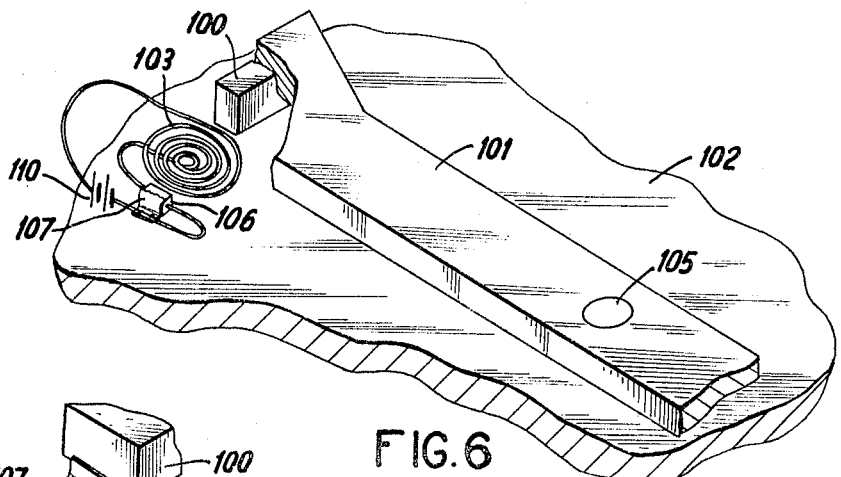
FIGS. 6 and 6B are perspective views of the second embodiment of the present invention.
Figure 6B:
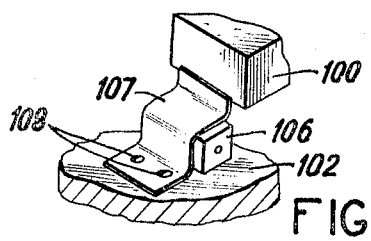

In the embodiment of FIGS. 6 and 6B a balance wheel arm 101 is mounted on a balance wheel staff 105. The staff is pivoted between a top plate (not shown) and a bottom plate 102. A permanent magnet 100, producing a +H flux field, is fixed on the end of balance wheel arm 101. The magnetic field passes above and near to coil 103. The coil 103, when pulsed with current and when proximate to the magnet 100, produces a torque to the balance wheel in the counterclockwise direction. The coil 102 is in series with one lead of magneto-diode 106 which is fixed on plate 102. The second lead of the magneto-diode 106 and the second lead of the coil are connected to the battery 110.

To prevent a torque in the clockwise direction, a very thin ferromagnetic leaf spring 107 acting as a magnetic shield, i.e., a one-way flap, is provided, see FIG. 6B. The spring 107 is attached to plate 102 at 108 and is moved by magnet 100 to uncover the magneto-diode 106 in one direction of movement. In the opposite direction of movement, the magnet pushes down on the spring so that the spring covers the magneto-diode 106 or the spring may return to cover the magneto-diode by its own force. The spring 107, when it covers the magneto-diode 106, is between the magnet 100 and the magneto-diode 106, preventing the field of the magnet from acting on the diode, so that the diode continues to block current flow.

Figure 7:
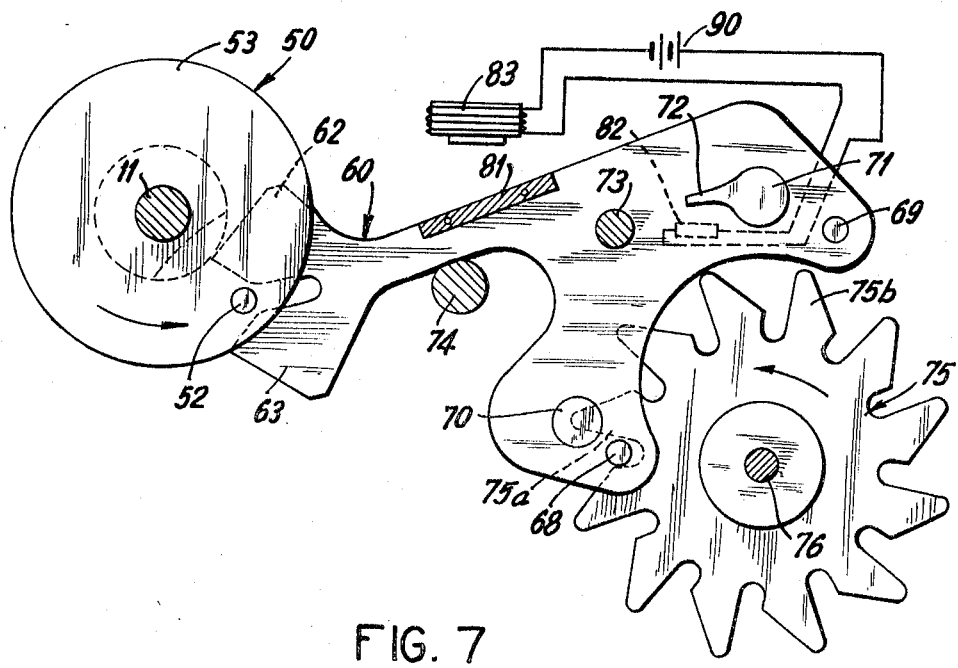
FIG. 7 is a plan view of the third embodiment of the present invention.

In the embodiment of FIG. 7 a balance wheel assembly 50 is provided with a roller 53 and a balance wheel staff 11. A fork lever 60 is pivoted in the frame plate on its staff 73. The fork lever 60 has horns 62 and 63 which cooperate with pin 52 carried by roller 53. The fork lever 60 is limited in its oscillation by banking pin 74. The lever 60 carries a first index pin 68, a first index magnet 70, a second index pin 69, and a second index magnet 71 having a finger portion 72.

An index wheel 75, mounted on staff 76 and having teeth 75a, 75b, is indexed by the pins 68 and 69. The index wheel is held against rotation, between index movements, by magnets 70 and 71.

A magneto-diode 82 is positioned on the plate below the lever 60. The finger 72 of magnet 71 is positioned so that it passes over and proximate to magneto-diode 82 during the oscillation of the lever. The magneto-diode is in series with battery 90 and the coil of the electromagnet 83. The electromagnet acts on the ferrous shunt piece 81 fastened to the lever, which is of non-magnetic material, for example, brass. At the end position of the lever the magnet finger 72 passes beyond magneto-diode 82, avoiding the continued flow of current.

The fork lever 60 performs the following functions: (1) as in conventional watches, the lever prevents the accidental overbanking of the balance wheel; (2) as in conventional mechanical watches, the lever provides an impulse to the balance wheel, the balance wheel acting similarly to an escapement oscillator and not as the armature of a motor; (3) the lever is the armature of the motor system; (4) the lever carries a magnet which controls, by means of the magneto-diode, the timing of current to the electromagnet; (5) the lever physically indexes the index wheel; (6) by means of its magnets 70 and 71, the lever locks the index wheel against rotation; and (7) by means of its magnets 70 and 71 the fork lever is locked in its end positions against banking pin 74. As in the previous embodiment of FIG. 6 some mechanism, such as a one-way cover spring on the magneto-diode, must be provided to prevent the passage of current during the return swing of the lever.

The magneto-diode of the present invention may also be utilized as a control element with circiuts known, per se, in an electronic watch. In the circuit of FIG. 8, a single coil 130 is carried by a balance wheel or other oscillating time-base element, such as a vibrator. The coil 130 moves relative to a magnet 131. Preferably the magnet-coil structure is that shown in Zemla U.S. Patent 3,046,460, which utilizes a moving coil, preferably a round coil, and three fixed permanent magnets. The terminal 132 of coil 130 is connected to a battery 134 and to resistor R1. The terminal 133 of coil 130 is connected to the collector of transistor Q2 to a first terminal of magneto-diode 135, and to the base of transistor Q1. The collector of transistor Q1 is connected, through resistor R2, to the base of transistor Q2. The emitter of transistor Q2 is connected, through resistor R3, to the battery 134 and to the second terminal of magneto-diode 135. The entire circuit may be integrated and mounted on the balance wheel or on the watch frame. A magnet 136 is positioned so that its +H flux field acts on the magneto-diode 135 when the coil 130 is over the north 1–south-north 2 pole faces of the magnets.

If the magneto-diode were to be omitted from the circuit of FIG. 8, the circuit would maintain oscillation of the balance wheel due to feedback from the coil, once the oscillation were started. It is assumed that the polarities are such that a voltage is induced in the coil 130 to make its end 133 negative with respect to its end 132, when the coil passes in the clockwise direction through the three magnets shown in FIG. 3. This voltage is applied to the base of transistor Q1 causing it to conduct. In turn, Q2 becomes conducting and a pulse of current passes through the coil, making end 133 even more negative. This direction of the current will generate a torque to aid the motion of the balance wheel in the clockwise direction. When the coil returns to the position of FIG. 3, this time moving in the counterclockwise direction, the voltage induced in the coil 130 makes its end 133 positive; hence Q1 does not conduct. When the coil has progressed in the counterclockwise direction to cover magnets S–38 and N1–37, the induced voltage makes coil end 133 negative; Q1 and Q2 conduct and a pulse of current in the same direction as before passes through the coil 130. However, since the coil 130 is now under the influence of S–38 and N1–37, the torque imparted is counterclockwise, thus again reinforcing the motion.

In the absence of any motion, no voltage is induced in the coil and Q1 is cut off. Thus the circiut of FIG. 8 (but without the magneto-diode) is not self-starting. This circuit may be made self-starting by connecting a resistor in place of the magneto-diode 135. Then Q1 will be conducting even without the help of any induced voltage and oscillation will start by it. However, such a circuit is wasteful of power, because a current flows through the coil and the resistor at all times.

When the resistor is not used, and the magneto-diode 135 is utilized in the circuit, the magneto-diode conducts only during the relatively brief period when the coil is in the field of the magnets N1–37, S–38 and N2–39. Consequently, the current drain is restricted substantially to the periods when useful mechanical energy may be derived from the interaction of the coil current with the magnets. At all other times the current drain is greatly reduced and yet the self-starting feature is retained.

Modifications may be made in the present invention. For example, the drive magnets may be interchanged with the coil, so that the magnets would be mounted on the balance wheel and the coil would be fixed to the plate. Similarly, the positions of the control magnet and the magneto-diode may be interchanged.

I claim:

1. In a horological movement adapted to be connected to a source of current, an oscillator acting as the time base, means to impulse the oscillator including an electric coil, a magneto-diode connected with the said coil and connectable to the current source, and a control magnet movable relative to the magneto-diode in time with the movement of the said oscillator.

2. A horological movement as in claim 1 wherein the impulse means includes a permanent magnet means whose field is crossed by the said coil.

3. A horological movement as in claim 2 wherein the permanent magnet means includes three magnets, a first and third magnet of one direction of flux and a second magnet of opposite direction of flux positioned between the said first and third magnets, and wherein the oscillator is a balance wheel, the coil is carried by the balance wheel, and the magnets are fixed to the movement.

4. A horological movement as in claim 1 wherein the magneto-diode is used for self-starting in a circuit utilizing a complementary pair of transistors, the circuit being connected to a single coil and connectable to said current source.

5. A horological movement as in claim 1 wherein the magneto-diode is removably covered by a shield of ferromagnetic material between the diode and its control magnet, and wherein said shield is uncovered by said oscillator.

6. A horological movement as in claim 1 wherein said oscillator is a balance wheel which indexes a lever and said control magnet is mounted on said lever, and said lever indexes an index wheel.

7. A horological movement as in claim 1 wherein said oscillator is a balance wheel and said magneto-diode is carried by said balance wheel.

8. A horological movement as in claim 6 wherein said magneto-diode is fixed on said movement and said coil is the coil of an electromagnet which acts on said lever as its armature.

References Cited

FOREIGN PATENTS 1,517,282   2/1968   France.

RICHARD B. WILKINSON, Primary Examiner

E. C. SIMMONS, Assistant Examiner

U.S. Cl. X.R.

318—132